H. HUDSON.
COLOR PHOTOGRAPHY.
APPLICATION FILED MAR. 26, 1918.

1,431,663. Patented Oct. 10, 1922.

WITNESSES

INVENTOR
HENRIETTA HUDSON
BY
ATTORNEYS

Patented Oct. 10, 1922.

1,431,663

UNITED STATES PATENT OFFICE.

HENRIETTA HUDSON, OF NEW YORK, N. Y.

COLOR PHOTOGRAPHY.

Application filed March 26, 1918. Serial No. 224,798.

*To all whom it may concern:*

Be it known that I, HENRIETTA HUDSON, a citizen of the Swiss Republic, and resident of the city, county, and State of New York, have invented certain new and useful Improvements in Color Photography, of which the following is a specification.

My invention relates to methods of making photographic color prints and in particular to a simple and expeditious photographic method whereby prints in natural colors which can be viewed by reflected light are obtained.

While colored prints have heretofore been obtained, the methods for obtaining them are expensive, requiring comparatively elaborate equipment and exceptional skill on the part of the operator. Hence colored photographic prints have not yet come into general use. One method necessarily employs three distinct negatives from which three separate color transparencies are made, which are subsequently superposed and squeegeed together. These transparencies must be accurately registered and held in place during the squeegeeing operation in order to obtain a passable print. Another method makes use of the fact that certain dyes are fugitive, i. e. are bleached out under the action of light. In this method, a plurality of coatings, dyed with appropriate fugitive colors, are superposed, then exposed and developed. As the coatings are superposed and hence are in contact with each other, dyes must be found which will not chemically react, which will bleach out equally, and give the right shades. The latter process is also difficult to carry out because it is almost impossible to regulate the bleaching so that it is stopped at the right moment.

In my method and in order to illustrate it, I will mention specific materials and order of steps, I do not desire it to be understood that I am limited thereto but may use various equivalent substances and change the order of some of my steps—one direct color negative of the object to be reproduced is preferably made. The negative may be one of the numerous and well known direct color negatives, that is to say a negative having color as distinguished from a plain black and white negative, e. g. an autochrome plate which has been developed in the usual manner and fixed without, however, reversing and re-developing, as is customary. From one of these negatives I make my color print, proceeding substantially as follows:—I prepare a suitable supporting surface, e. g. wood, paper or silk, for my first exposure by coating it in any convenient manner, e. g. by a hand brush, with a suitable light sensitive colloid (e. g. gum arabic and potassium dichromate) impregnated with a suitable permanent color, preferably yellow. I interpose a suitable color filter (i. e. minus blue when yellow is used in the first coating) between the prepared surface and the negative, or the light and the negative. I then expose the prepared surface under the negative to either artificial light or sunlight. Instead of employing a filter, I may employ a suitable colored, preferably monochromatic light. After exposure I develop the first coating usually in cold water, as is well known in the art, and allow it to dry. The portions of the colloid on which the light has impinged are rendered insoluble and bind the color to the supporting surface. A print having gradations of yellow—in case yellow has been employed—and white is obtained. I then coat the dried, partially colored print with a second coating of colloid impregnated with a second color, e. g. red, and repeat the printing operation described for the first coating with a suitable complementary color filter (i. e. minus green filter when a red impregnated coating is used), develop and allow it to dry. The print now shows (in case such colors were present in the negative gradations of red, of yellow, of the colors intermediate between red and yellow, and white. Preferably I then coat my dried, partially colored print with a colloid impregnated with a third color, e. g. blue, and repeat the printing operations described for the other two coatings using, of course, the requisite filter (i. e. minus red). I shall then have obtained a print of the negative with its colors reproduced.

The invention will be better understood from a description of one specific method of making a print in accordance therewith, reference being had to the accompanying drawings, forming a part hereof, in which Figure 1 is a plan view of a direct color negative for example a Lumière plate negative of flowers of different colors.

Figure 1:
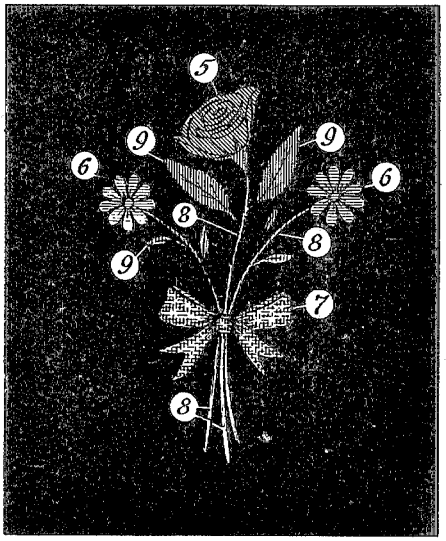

In the drawing the several colors are conventionally indicated to show the colors as they appear, both in the negative and in the positive.

Figure 2:
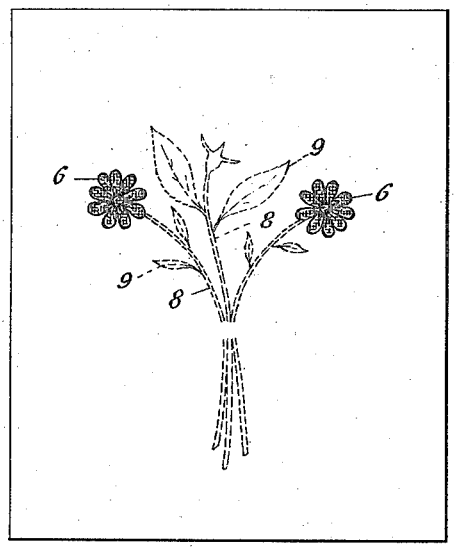
Fig. 2 is a similar view of a positive printed therefrom, showing only the result of the first printing operation in which the yellow color values only are printed.
Figure 3:
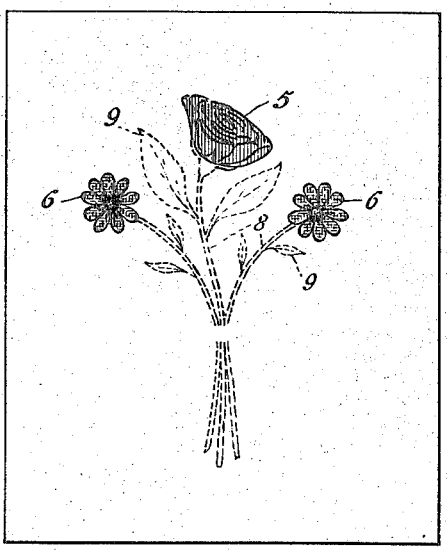
Fig 3 shows the same positive after the second printing operation.
Figure 4:
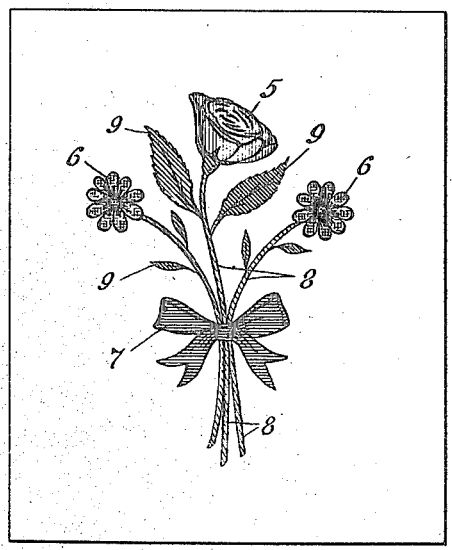
Fig. 4 shows the final complete positive.

The negative shown in Fig. 1 is a direct color negative exposed and developed as usual but not reversed. The red rose 5 appears green, the yellow daisies 6, 6 blue, and the blue ribbon 7 yellow. These colors are conventionally indicated in the drawing by appropriate crosshatching. Such negative is employed to produce a natural color positive print, for example as follows;

A paper is coated with a suitable sensitive colloid impregnated with a suitable permanent color (e. g. yellow). The yellow color values may then be printed upon the prepared surface by exposure in direct contact with the negative, a suitable filter being introduced, preferably between the source of light and the negative. After this exposure, the first coating is developed and allowed to dry. The result of this printing is shown in Fig. 2. The yellow daisies 6, 6 are shown in full lines indicating that they are fully printed in this first operation. The stems 8, 8 and leaves 9, 9 are indicated in dotted lines indicating that they are only partially printed because the yellow quality is only a portion of these parts. The dried print is next provided with a second coating of colloid impregnated with a second color, (e. g. red), and the printing operation described for the first coating is repeated, using a suitable color filter to cause the red color values to be printed. This coating is developed and allowed to dry. The print, as it appears after this second operation, is indicated in Fig. 3, the red rose and yellow daisies being shown in full lines, but the leaves and stems being still shown in dotted lines, that is to say, the only effect upon the print, produced by the second operation is to add the red color values to the print. This print, after drying, is provided with a third coating of a colloid impregnated with the third color (e. g. blue) and the printing operation is repeated, using the requisite filter to print the blue color values. The third coating is then developed and dried, giving the result shown in Fig. 4, that is to say, the blue color values are added to the print. The addition of such blue color values adds the ribbon 7 and brings out the full color value of the green stems and leaves. This is indicated in the drawing by showing these parts in full lines.

The description of the particular process is illustrative only and should not be understood as a restrictive description of the process of the invention.

My invention contemplates using the three complementary colors, yellow, red, blue, for filtering instead of the colors heretofore usually employed in three color work, viz., red, blue, green or shades thereof, and I find that thus prints of great purity and color value are obtained.

I can, of course, instead of using three coatings, use only two colored coatings, in which case my prints would not register all the colors of the spectrum as correctly as my three coatings would, and I can employ four colored coatings or even more, if desired.

When I speak of colored coating in my claims, I mean a coating comprising any suitable material capable of imparting a colored appearance after development and including suitable dyes, paints or inks; when I speak of developing I mean to include drying and when I speak of exposing I mean with suitable filtering means.

I claim:

1. The improvement in the art of making color prints from a direct color negative which comprises applying a colored light-sensitive coating to a support, exposing said coating through the direct color negative to color separated light of one color, developing the coating, applying a differently colored light-sensitive coating to the same support, exposing said coating through the same direct color negative to color separated light of another color and developing said coating, substantially as described.

2. The improvement in the art of making color prints from a direct color negative which comprises applying a colored light-sensitive coating to a support, exposing said coating through the direct color negative to color separated light of a quality corresponding to a color existing in the negative, developing said coating, applying another colored light-sensitive coating to the support and exposing said coating through the same direct color negative to color separated light of a quality corresponding to another color existing in the negative, substantially as described.

3. The improvement in the art of making color prints from a direct color negative which comprises applying a light-sensitive coating to a support, exposing said coating through the direct color negative to color separated light of a quality corresponding to a color existing in the negative, developing said coating in a manner to produce on the print a corresponding color quality, applying another light-sensitive coating to said support, exposing said coating through the same direct color negative to color separated light of another color quality, and developing said coating in a manner to produce on the print a second color quality, substantially as described.

In testimony whereof I have hereunto set my hand.

HENRIETTA HUDSON.